United States Patent
Riedmueller et al.

(10) Patent No.: US 8,823,371 B2
(45) Date of Patent: Sep. 2, 2014

(54) SENSOR ARRANGEMENT AND METHOD FOR OPERATING A SENSOR ARRANGEMENT

(75) Inventors: Kurt Riedmueller, Unterpremstaetten (AT); Josef Janisch, Ilz (AT)

(73) Assignee: AMS AG, Unterpremstätten (AT)

( * ) Notice: Subject to any disclaimer, the term of this patent is extended or adjusted under 35 U.S.C. 154(b) by 393 days.

(21) Appl. No.: 13/049,807

(22) Filed: Mar. 16, 2011

(65) Prior Publication Data

US 2011/0227567 A1 Sep. 22, 2011

(30) Foreign Application Priority Data

Mar. 17, 2010 (DE) .......................... 10 2010 011 723

(51) Int. Cl.
*G01R 33/02* (2006.01)
*G01D 5/14* (2006.01)

(52) U.S. Cl.
CPC ....................................... *G01D 5/145* (2013.01)
USPC ....................................................... 324/244

(58) Field of Classification Search
None
See application file for complete search history.

(56) References Cited

U.S. PATENT DOCUMENTS

| | | | |
|---|---|---|---|
| 5,568,048 A * | 10/1996 | Schroeder et al. | 324/207.21 |
| 6,211,670 B1 * | 4/2001 | DeWilde et al. | 324/207.21 |
| 6,969,988 B2 | 11/2005 | Kakuta et al. | |
| 2001/0012988 A1 | 8/2001 | Motz | |
| 2003/0225539 A1 | 12/2003 | Motz et al. | |
| 2008/0315865 A1 | 12/2008 | Doogue et al. | |
| 2009/0102460 A1 | 4/2009 | Schott et al. | |
| 2009/0243606 A1 * | 10/2009 | Riedmuller | 324/244 |

FOREIGN PATENT DOCUMENTS

| | | |
|---|---|---|
| DE | 199 64 002 | 7/2001 |
| DE | 102 23 767 | 12/2003 |
| DE | 10 2008 015 698 | 10/2009 |

OTHER PUBLICATIONS

"AS5304/AS5306—Integrated Hall ICs for Linear and Off-Axis Rotary Motion Detection" Preliminary Data Sheet, austrimicrosystems AG, Revision 1.5, pp. 1-13.
G. Pepka, "Position and Level Sensing Using Hall Effect Sensing Technology", Allegro MicroSystems, Inc., AN295044, Rev. 1, pp. 1-7, downloaded from the internet on Jan. 14, 2010.

* cited by examiner

*Primary Examiner* — Melissa Koval
*Assistant Examiner* — Courtney McDonnough
(74) *Attorney, Agent, or Firm* — McDermott Will & Emery LLP

(57) ABSTRACT

A sensor arrangement comprises a first, a second and a third magnetic field sensor that are arranged along a curved principal direction. A first combination means is connected to the first and second magnetic field sensors and a first channel signal can be derived from the signals of the first and second magnetic field sensors by the first combination means. A second combination means is connected to the first, second and third magnetic field sensors (SM1, SWM2, SM3. A second channel signal is derived by the second combination means from signals of the first, second and third magnetic field sensors. An evaluation unit that is connected to the first and second combination means is set up to derive an end position of a magnetic source movable relative to the sensor arrangement as a function of the first and second channel signals.

11 Claims, 3 Drawing Sheets

SENSOR ARRANGEMENT AND METHOD FOR OPERATING A SENSOR ARRANGEMENT

RELATED APPLICATIONS

This application claims the priority of German application no. 10 2010 011 723.4 filed Mar. 17, 2010, the entire content of which is hereby incorporated by reference.

FIELD OF THE INVENTION

The invention relates to a sensor arrangement and a method for operating a sensor arrangement.

BACKGROUND OF THE INVENTION

Magnetic field sensors, particularly Hall sensors, are widely used for noncontact detection of positions and angles. Two configurations have basically established themselves: a bipolar arrangement and a unipolar arrangement. In the bipolar arrangement, for example, a magnetic field source such as an ordinary commercial magnet is moved along a direction x that extends parallel to the face of the magnetic field sensor. In the unipolar configuration, such a magnetic field source is moved along a direction perpendicular to the face of the magnetic field sensor.

FIG. 1A shows a typical bipolar arrangement of magnetic field sensors SM1, SM2, SM3 and a movable magnetic field source N, S. A sensor chip IC extends in a plane with an axis of motion X. The sensor chip IC comprises a first, second, third magnetic field sensor SM1, SM2, SM3 that are arranged along the axis of motion X. The magnetic field source N, S with a north pole N and a south pole S and that runs along the axis of motion X is situated above the sensor chip IC.

FIG. 1B shows the sensor arrangement from FIG. 1A viewed from the side. As a rule, the magnetic field source N, S in such arrangements is a certain distance away from the sensor chip IC. This distance is typically referred to as an air gap. This distance, as well as other parameters such as the magnetization of the magnets that are used, can be taken into account in many magnetic field sensors by calibration routines for a precise measurement.

FIG. 1C shows a characteristic magnetic field curve when the magnetic field source N, S is moved along the axis of motion X. In the figure, the magnetic field strength B is plotted versus the axis of motion X. The illustrated functional relationship corresponds, for instance, to the signal of one of the magnetic field sensors SM1, SM2, and SM3 measured with the sensor arrangement from FIGS. 1A and 1B. The combined signal is supplied to a signal processor that derives positions and angles from it.

The unipolar arrangement is not shown. With it, the magnetic field source N, S is rotated by 90° and is moved with one of the poles N, S along a direction Z that runs perpendicular to the sensor chip.

Both the unipolar and the bipolar method have in common that they must define a suitable end position for the movement of the magnetic field source N, S. Such an end position is generally reached when a given previously defined magnetic field strength or a threshold value is reached by the movement of the magnetic field source N, S. Thereby the end position becomes susceptible, however, to magnetic fields or interference fields of the type that occur in the surroundings of the magnets or electromagnetic sources during their respective applications.

To take such interfering fields into account, differential techniques have been proposed which, for example, comprise several Hall elements and link the corresponding sensor signals of the individual elements to one another in such a manner that they correspond to first and/or second derivatives of the magnetic field. A typical example of such a differential detector is a ratiometric sine/cosine encoder of the type used for multipolar magnetic strips. In such detectors, a ratio of the sine and cosine functions is usually formed and an angle or a position is derived. A magnetic field sensor will be referred to below as ratiometric if an output signal can be derived from a ratio of input parameters with the same interference superimposition. In the present case, the measured angle is formed by a ratio of the sine and cosine functions of the sensor signals. The two functions are dependent on an air gap, for example, which is the same for both parameters, however. Due to the formation of the ratio, the output signal becomes independent of such influences, or ratiometric.

The aforementioned detectors have the disadvantage, however, that they only supply a signal as long as a magnetic field source is located above the sensor. If it is removed, then the output signal of such detectors is undefined.

SUMMARY OF THE INVENTION

One object of the present invention is to provide a sensor arrangement and a method for operating a sensor arrangement that is dependent to a lesser extent on magnetic interference fields and provides a well-defined output signal.

One exemplary embodiment of a sensor arrangement comprises a first, a second and a third magnetic field sensor that are arranged along a curved principal direction. This sensor arrangement further comprises a first combination means, which is connected to the first and second magnetic field sensors. A second combination means is connected to the first, second, and third magnetic field sensors. An evaluation unit is connected to the first and second combination means and set up to derive an end position of a magnetic source movable relative to the sensor arrangement as a function of the first and second channel signals.

The sensor arrangement is preferably operated with a movable magnetic source that is movable relative to the sensor arrangement along an axis of motion. Depending on the relative position along the axis of motion, the first, the second and the third magnetic field sensors correspondingly generate the signals of the first, the second and the third magnetic field sensors. The first combination means derives a first channel signal from the signals of the first and second magnetic field sensors. The second combination means derives a second channel signal from the signals of the first, second and third magnetic field sensors. The evaluation unit combines the first and second channel signals and detects in this way whether the end position of the movement of the magnetic source has been reached.

By using the first and second combination means, it advantageously becomes possible to compensate for magnetic interference fields from the environment that act on the sensor arrangement, and thus to generate well-defined first and second channel signals with the output unit. Well-defined in this regard means that the position of the magnetic field source movable relative to the sensor arrangement can be determined despite generally alternating interference fields. The sensor also indicates with a characteristic signal if the magnetic field source has been removed.

The magnetic field sensors are arranged along the curved principal direction. They can be arranged, for example, along a straight line. This is not mandatory, however, and the magnetic field sensors can, alternatively, be arranged along a circular line or in a sensor array.

In another embodiment, the first combination means is set up to determine the first channel signal as a difference of the signals of the first and second magnetic field sensors. The second combination means is set up to determine the second channel signal as the difference between the sum of the signals of the first and second magnetic field sensors and the signal of the third magnetic field sensor.

If there is an external interference field present at the sensor arrangement in addition to the magnetic field source movable with the sensor arrangement, it can be taken into account as a corresponding DC signal by the subtraction in the first and second channel signals. In this manner, it is advantageously possible to compensate the influence of external magnetic interference sources. The signal of the second magnetic field sensor is preferably doubled and taken into account in the difference.

In another embodiment, the evaluation unit comprises a first and a second comparison means. The comparison means compare, respectively, the first and second channel signal to a respective first or second adjustable threshold value. The comparison means additionally generate an end position signal as a function of the comparison of the first and the second channel signal to the first and the second threshold value, respectively.

Both the first and the second channel signal are well defined for all adjustable positions along the axis of motion of the movable magnetic field source. Due to the comparison to the first and the second adjustable threshold value, it is advantageously possible to realize an end position determination that is well defined for all possible positions along the axis of motion of the magnetic field source. This is the case even if the magnetic field source is not present. The two threshold values and their comparison lead to an unambiguous signal being nevertheless generated.

In another embodiment, the first and second comparison means comprise, respectively a first and a second comparator, the first channel signal and the first threshold value being supplied to the first comparator, and the second channel signal and the second threshold value to the second comparator. A logic unit that is connected to one output of the first comparator and to one output of the second comparator generates the end position signal as a function of the comparison of the first and second channel signals to the first and second threshold values.

The comparison of the first and second threshold value to the first and second channel signal can advantageously be realized with the comparators. In this manner, it is possible to implement the sensor arrangement in a space-saving and power-saving manner on an integrated circuit.

In another embodiment, a functional module comprises the first and second comparison means. The first and second channel signals are fed to the functional module and the functional module generates the end position signal as a function of the comparison of the first and the second channel signal to the first and the second threshold value, respectively.

Various functional linkages can be realized with the aid of the functional module. Thus, such a module can also comprise the first and second combination means and in this manner can combine the combination means and the evaluation unit in a compact component. In particular, the threshold values are flexibly adjustable by a user and can be adapted to the desired application. Moreover, digital components can be used for the sensor arrangement together with the functional component. It is advantageously possible to implement digital signal processing.

In another embodiment, the second threshold value is determined by the first channel signal and multiplication by a factor.

Due to the coupling of the second threshold value to the first channel signal, the sensor arrangement can be operated ratiometrically and, for example, an air gap between the magnetic field source and the sensor or a magnetization of the magnets used with the sensor arrangement can be taken into account implicitly.

In another embodiment, the first, second and third magnetic field sensors are arranged along the curved principal direction in such a manner that the third magnetic field sensor is between the first and the second magnetic field sensors.

In one embodiment, the method for operating a sensor arrangement comprises a generation of sensor signals with a first, a second and a third magnetic field sensor that are arranged along a curved principal direction. The method further comprises a combination of sensor signals into a first channel signal as well as a combination of sensor signals into a second channel signal. A signal for the end position of a magnetic field source movable relative to the sensor arrangement is generated and evaluated as a function of the first and the second channel signal.

By combining the sensor signals, it is advantageously possible to take into account external interference field sources that can be present at the three magnetic field sensors due to environmental influences. By evaluating the end position signal as a function of the first and the second channel signal, it is additionally possible to obtain a well-defined end position signal that supplies a characteristic value even if no magnetic field source is present at the sensor arrangement.

In another embodiment, the combining of the sensor signals into the first channel signal comprises the taking of a difference between the signals from the first and the second magnetic field sensor, and the sensor signals are combined into the second channel signal by adding the signals of the first and the second magnetic field sensor and subtracting the signal of the third magnetic field sensor.

External magnetic interference fields at the sensor arrangement lead to a corresponding DC signal. This can be taken into account by taking the difference between the first and second signal. In this manner it is advantageously possible to compensate the influence of external magnetic interference sources. The signal of the second magnetic field sensor is preferably doubled and taken into account in the difference.

In another embodiment, the end position is generated and evaluated as a function of a comparison of the first and the second channel signal to a respective first and second adjustable threshold value.

Both the first and the second channel signal are well defined for all adjustable positions along the axis of motion of the movable magnetic field source. Due to the comparison to the first and the second adjustable threshold value, it is advantageously possible to realize an end position determination that is well defined for all possible positions along the axis of motion of the magnetic field source. This is the case even if the magnetic field source is not present. The two threshold values and their comparison lead to the generation of an unambiguous signal.

In another embodiment, the second threshold value is determined by the first channel signal and multiplication by a factor.

By virtue of the coupling of the second threshold value to the first channel signal, the method can run ratiometrically and thus implicitly take into account an air gap between the magnetic field source and the sensor arrangement, or other parameters as well, such as a magnetization of the magnets that are used.

BRIEF DESCRIPTION OF THE DRAWINGS

Exemplary embodiments of the invention will be described in detail below with reference to the drawings. Elements with identical function or effect bear identical reference numbers. Insofar as elements correspond to one another in function, a description of them will not be repeated in each of the following figures.

DETAILED DESCRIPTION OF THE DRAWINGS

Figure 1A:
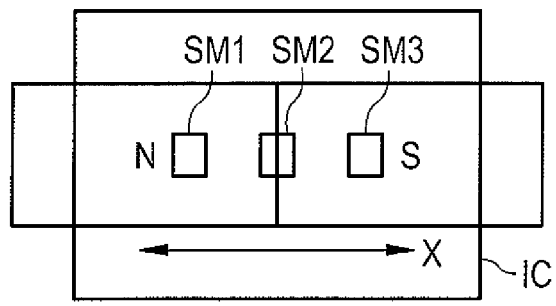
FIG. 1A shows a plan view of a bipolar magnetic field sensor arrangement.
Figure 1B:
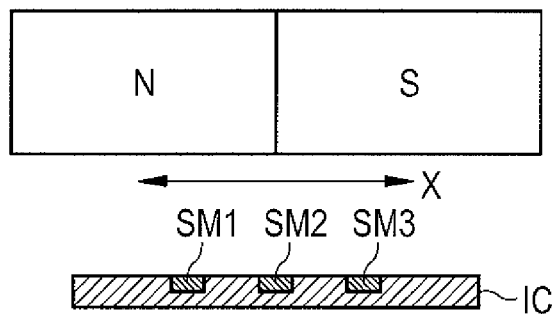
FIG. 1B shows a side view of a bipolar magnetic field sensor arrangement.
Figure 1C:
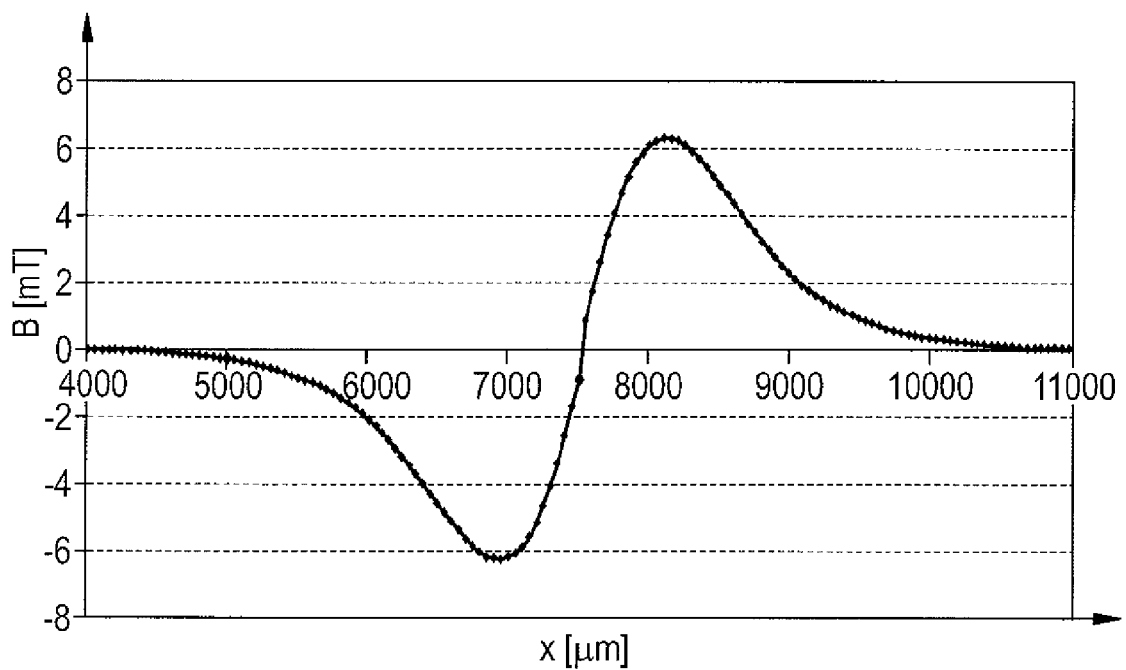
FIG. 1C shows a characteristic magnetic field curve measured with the magnetic field sensor arrangement from FIGS. 1A and 1B.
Figure 2:
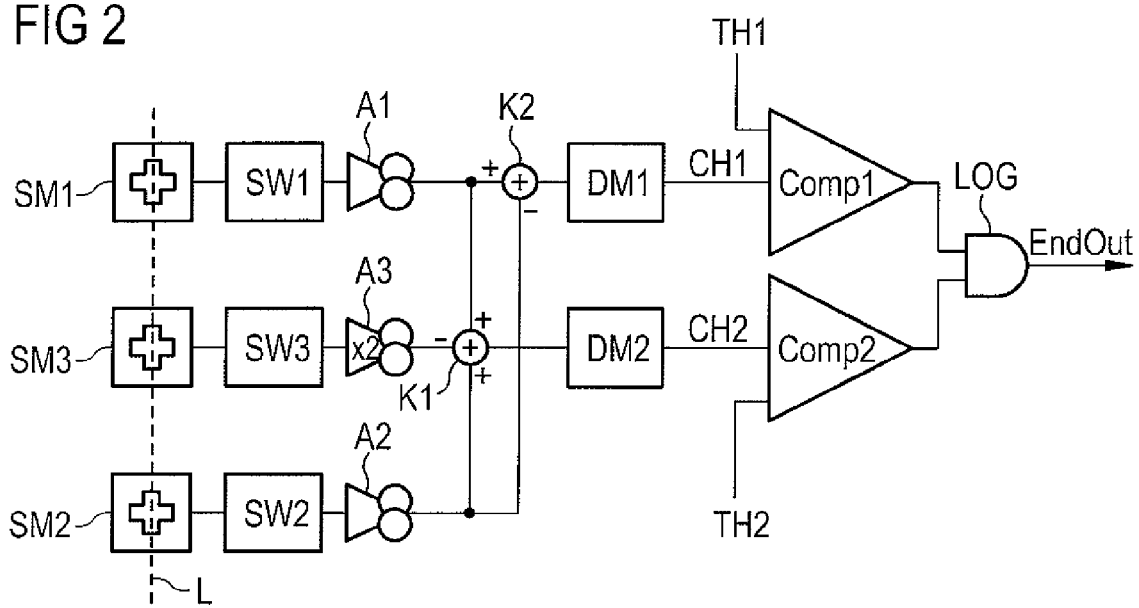
FIG. 2 shows an exemplary embodiment of a sensor arrangement according to the invention.

FIG. 2 shows a sensor arrangement according to an embodiment of the invention. The sensor arrangement comprises a first, second and third magnetic field sensor SM1, SM2, SM3. These magnetic field sensors SM1, SM2, SM3 are preferably constructed as Hall elements. The first, second and third magnetic field sensors SM1, SM2, SM3 are respectively coupled via a first, second and third switch SW1, SW2, SW3 to a first, second and third signal amplifier A1, A2, A3. Each of these signal amplifiers A1, A2, A3 is connected to a first combination means K1. The first combination means K1 has two positive inputs +, which are connected to the first signal amplifier A1 and the second signal amplifier A2. A negative input − of the first combination means K1 is connected to the third signal amplifier A3. The first and second signal amplifiers A1, A2 are also coupled to a second combination means K2. The second combination means K2 has a negative input − that is connected to the second signal amplifier A2 and a positive input + that is connected to the first signal amplifier A1. The second combination means K2 is additionally connected via one output to a first demodulator DM1; the first combination means K1 is connected via one output to a second demodulator DM2.

A first comparator Comp1 has two inputs, one input being connected to the first demodulator DM1, and a first threshold value TH1 being present at the second input. A second comparator Comp2 likewise has two inputs, one input being connected to the second demodulator DM2, and a second threshold value TH2 being present at the second input. Outputs of the first comparator and second comparator Comp1, Comp2 are combined via a logic unit LOG, at the output of which in turn an end position signal EndOut is provided.

The first, second and third magnetic field sensors SM1, SM2, SM3 generate a first, second and third signal S1, S2, S3, which, for example, is dependent on the position of a magnetic field source N, S movable relative to the sensor arrangement along an axis of motion X. These signals generally have an offset. Two offset sources must be distinguished here. An internal offset occurs even without an external magnetic field, due to temperature and material variations in the magnetic field sensors that are used. Such an offset is familiar from Hall elements, for example, and is the subject matter of numerous methods and measures for compensation. Thus, compensating for the internal offset for Hall elements with a technique referred to as current spinning is known.

Current spinning is implemented with the aid of switches SW1, SW2, SW3. The switches comprise all the necessary components and will not be discussed further here. By alternating switching of the electrodes of the magnetic field sensors, for example, the direction of Hall currents is changed and the signals S1, S2, S3 of the magnetic field sensors SM1, SM2, SM3 are modulated. The internal offset of the magnetic sensors SM1, SM2, SM3 is compensated by demodulation of the modulated signals in the demodulators DM1, DM2. In principle, different implementations of current spinning are possible. For example, the magnetic field sensors that are used can have different numbers of electrodes. Current spinning can then take place by switching four, six or more electrodes.

A second offset compensation relates to external influences, such as magnetic interference fields, of the type that occur in many applications. For this purpose, the appropriately modified first, second and third signals S1, S2, S3 are first supplied to respective signal amplifiers A1, A2, A3. These signal amplifiers A1, A2, A3 preferably amplify the signals S1, S2, S3 into a current, the third signal S3 of the third magnetic field sensor SM3 preferably being doubled. The second compensation means then takes the difference of the signals S1, S2, S3 according to $$\mathrm{mod}\, CH1 = S1 + S3 - 2 \cdot S2,$$

where ModCH1 refers to a modulated first channel signal. This modulated first channel signal is then fed to the first demodulator DM1 and demodulated into a first channel signal CH1.

Furthermore, the modified first and second signals S1, S2 are combined by means of the second combination means K2 and correspondingly supplied to the first demodulator DM2 and demodulated into a second channel signal CH2. In this manner, the first and second channel signals CH1, CH2 are cleaned of the two above-mentioned offset influences.

The first and second channel signals CH1, CH2 are then respectively supplied to the first comparator Comp1 or the second comparator Comp2. The first and second comparators Comp1, Comp2 then compare the first and second channel signal CH1, CH2 to a first threshold value TH1 or a second threshold value TH2, respectively. The result of this comparison is supplied to a logic unit LOG, or an AND gate. If, for example, both the first channel signal and the second channel signal CH1, CH2 are above their corresponding first and second threshold values TH1, TH2, a characteristic end position signal EndOut is generated.

Figure 3:
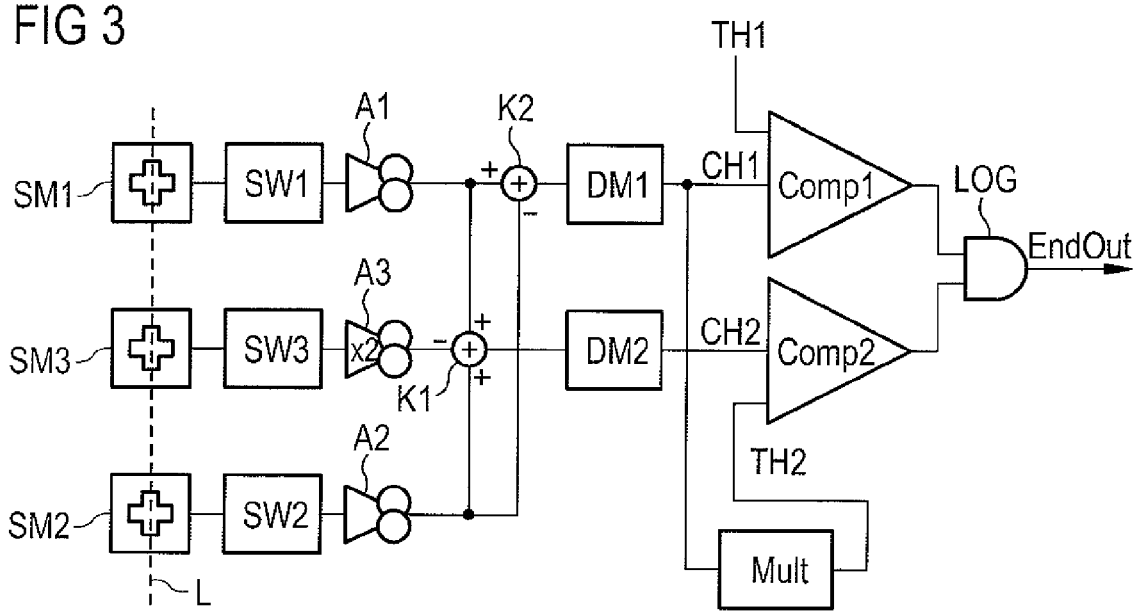
FIG. 3 shows an exemplary embodiment of the sensor arrangement of FIG. 2 according to the invention.

FIG. 3 shows another embodiment of the sensor arrangement of FIG. 2 according to an embodiment of the invention. Here the second threshold value TH2 is coupled via a multiplier Mult to the first channel signal CH1.

The sensor arrangement can be operated ratiometrically due to the coupling of the second threshold value TH2 to the first channel signal CH1. Thus it is possible, for instance, to implicitly take into consideration an air gap between the magnetic field source and the sensor arrangement or other parameters as well, such as a magnetization of the magnets that are used. For magnetic field sensors SM1, SM2, SM3, as Hall elements, their signals S1, S2, S3 are proportional to a magnetic field strength B. Since both the first and the second channel signals CH1, CH2 represent simple sums of the signals S1, S2, S3, they are also proportional to the magnetic field strength B. The linkage of the second threshold value TH2 to the first channel signal CH1 by means of the multiplication factor k represents in a certain sense the formation of a ratio of the threshold values, and the second threshold value TH2 becomes ratiometric to the first threshold value TH1. The sensor arrangement is advantageously extensively independent of parameters such as an air gap or the magnetization of the magnetic field, because these parameters vanish due to the formation of a ratio from the signal processing. By suitable selection of the multiplication factor k, a user can additionally perform a fine adjustment of the end position of the sensor arrangement.

Figure 4:
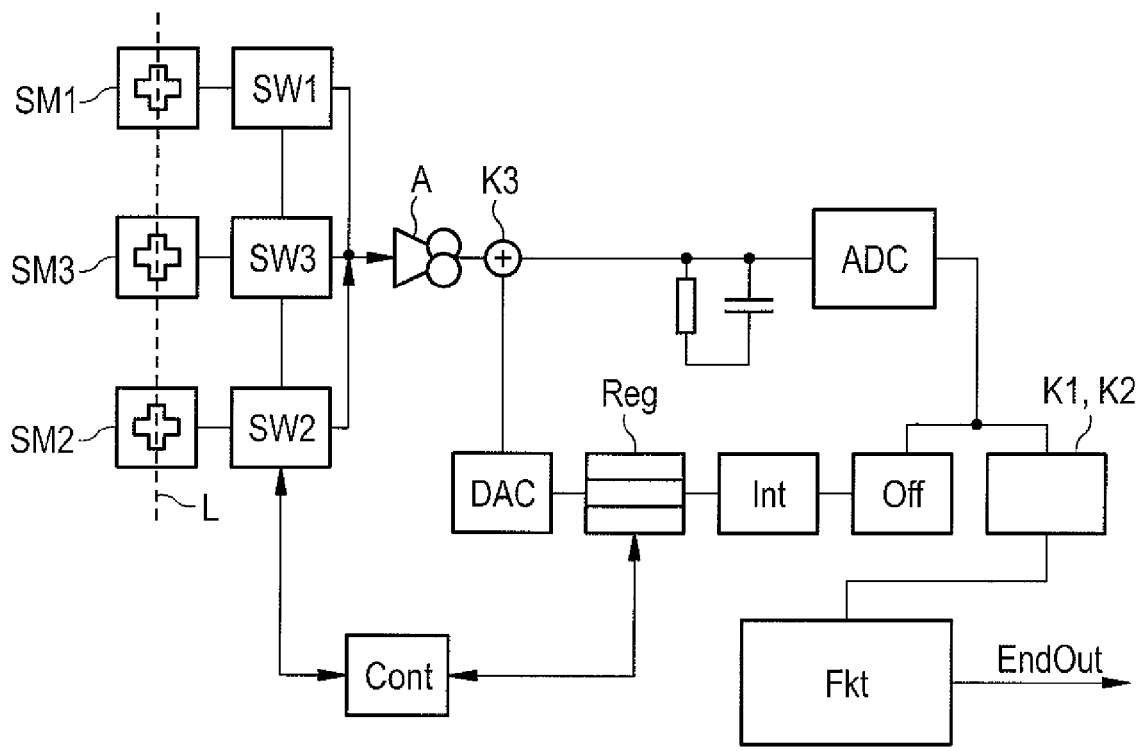
FIG. 4 shows another, alternative exemplary embodiment of a sensor arrangement according to the invention.

FIG. 4 shows a modified sensor arrangement according to an embodiment of the invention. The implementation illustrated here corresponds to a digital implementation of the current spinning method.

The first, second and third switches SW1, SW2, SW3 are supplied here to a single signal amplifier A. It is linked via a third combination unit K3 to an analog-digital converter ADC. This analog-digital converter ADC is connected both to an additional combination means K1, K2, and to an offset compensation unit Off. The offset compensation unit Off is coupled via a series connection of an integrator Int, a register Reg and a digital-analog converter DAC to the third combination means K3. A control unit Cont is inserted between the switches SW1, SW2, SW3 and the register Reg. The combination means K1, K2 is connected to a functional module Fkt. The functional module Fkt provides the end position signal EndOut at its output The switches SW1, SW2, SW3 are controlled via the control unit Cont and successively connect the first, second and third magnetic field sensors SM1, SM2, SM3 to the signal amplifier A. To compensate an internal offset, two signals Vph1, Vph2 are generated for each magnetic field sensor SM1, SM2, SM3, for example, by alternating switching of the electrodes of the magnetic field sensors SM1, SM2, SM3.

These signals are supplied via the third combination means K3 to the analog-digital converter ADC and transformed there into digital signals. From the signals Vph1, Vph2, an Offset is determined in the offset compensation unit Off for each of the magnetic field sensors SM1, SM2, SM3:

$$Offset = Vph1 + Vph2.$$

The latter is written into the register Reg via the integrator Int. Thus an individual offset is stored for each of the magnetic field sensors SM1, SM2, SM3. The register Reg is suitably indexed via the control unit Cont. The control unit Cant also controls which of the magnetic field sensors SM1, SM2, SM3 is connected to the signal amplifier A. According to the selected magnetic field sensor SM1, SM2, SM3, the offset stored in the register Reg is fed back via the digital-analog converter DAC to the third combination means K3 and thus compensated.

Offsets due to external interference fields are compensated with the combination means K1, K2 and the functional component Fkt. In the combination means K1, K2, the signals Vph1 and Vph2 of the individual magnetic field sensors SM1, SM2, SM3 are first subtracted, and the first and second channel signals CH1, CH 2 are generated:

$$Ch1 = S1 - S2$$

$$CH2 = S1 + S2 - 2 \cdot S3$$

S1, S2, S3 here refer to the first, second and third magnetic field sensors SM1, SM2, SM3. Each of these signals is already (internally) offset-corrected and results from the signals Vph1, Vph2 of the corresponding sensor as $$Sn = Vph1(n) - Vph2(n).$$

where the index n represents the respective magnetic field sensor SM1, SM2, SM3.

The end position signal EndOut is generated by digital and functional linkage in the functional module Fkt and is provided at the output of the functional module Fkt as an end position signal EndOut. For example the end position signal is determined according to:

$$EndOut \propto (CH2 > TH2)\hat{\ }(CH1 > TH1).$$

Figure 5:
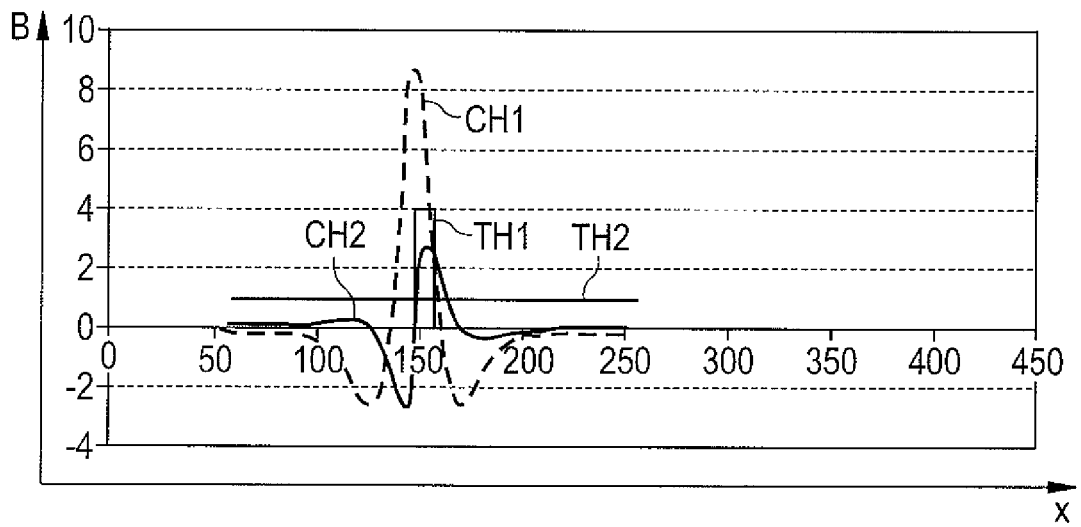
FIG. 5 shows an exemplary curve of channel signals of a sensor arrangement according to the invention.

FIG. 5 shows a characteristic signal curve of a sensor arrangement according to the proposed principle. The magnetic field strength B is plotted as a function of the motion direction X. The line marked CH1 shows the functional curve of the first channel signal CH1, and the signal indexed CH2 shows the curve of the second channel signal CH2. The first and second threshold values Th1, TH2 are also drawn in.

The position of the magnetic field source N, S along the axis of motion X can be determined from the second channel signal CH2 of the sensor arrangement. An end position is determined with the second threshold value TH2. It has been reached if the second channel signal CH2 falls below the second threshold value TH2 due to the movement of the magnetic field source N, S. Negative values of the second channel signal CH2 can also be suitably taken into account, so that even in these cases a correct position or end position is indicated.

The first channel signal CH1 represents an advantageous supplement. With the described sensor arrangement or the second channel signal CH2, a position of the magnetic field source N, S near or in the zero crossing point of the second channel signal CH2 would indicate that an end position has been reached. However, if the first channel signal CH1 is above the first threshold value TH1, as in this range, the end position has not yet been reached and is correctly detected by the sensor arrangement. This is the case even if the magnetic field source N, S is distant. Then both channel signals CH1, CH2 are at a characteristic value and are well defined. In particular, no calculation such as an arctan function is used for position determination. It would be indefinite without a magnetic field source N, S because it would lead to an undefined division by zero.

The end position signal EndOut indicates the reaching of the end position when the first and second channel signals CH1, CH2 both fall below their corresponding threshold values TH1, TH2. The first and second threshold values TH1, TH2 are advantageously selected by a user according to the magnetic interference fields that occur in the application.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

We claim:

1. A sensor arrangement, comprising:
    a first, a second and a third magnetic field sensor that are arranged along a curved principal direction;
    a first combination means that is connected to the first and second magnetic field sensors and by means of which a first channel signal can be derived from signals of the first and second magnetic field sensors;
    a second combination means that is connected to the first, second and third magnetic field sensors and by means of which a second channel signal can be derived from signals of the first, second and third magnetic field sensors; and an evaluation unit that is connected to the first and second combination means and is set up to derive, as a function of the first and second channel signals, an end position of a magnetic source movable relative to the sensor arrangement, wherein the evaluation unit comprises a first and second comparison means that:

compare the first and second channel signals to a first adjustable threshold value and a second adjustable threshold value, and generate, when the first channel signal is higher than the first adjustable threshold value and the second channel signal is higher than the second adjustable threshold value, an end position signal as a function of the comparison of the first and second channel signals to the first and second adjustable threshold values.

2. The sensor arrangement according to claim 1, wherein:
the first combination means is set up to derive the first channel signal as the difference of the signals of the first and second magnetic field sensors; and
the second combination means is set up to determine the second channel signal as the difference between the sum of the signals of the first and second magnetic field sensors and the signal of the third magnetic field sensor.

3. The sensor arrangement according to claim 1, wherein:
the first comparison means comprises a first comparator wherein the first channel signal and the first threshold value are fed to the first comparator,
the second comparison means comprises a second comparator wherein the second channel signal and the second threshold value are fed to the second comparator; and
a logic unit is coupled to a respective output of the first and second comparators and generates the end position signal as a function of the comparison of the first and second channel signals to the first and second threshold values.

4. The sensor arrangement according to claim 1, wherein a functional module comprises the first and second comparison means,
to which functional module the first and second channel signals are fed, and
which functional module generates the end position signal as a function of the comparison of the first and second channel signals to the first and second threshold values, respectively.

5. The sensor arrangement according to claim 1, wherein the second threshold value is determined by the first channel signal and multiplication by a factor.

6. The sensor arrangement according to claim 1, wherein the first, second and third magnetic field sensors are arranged along the curved principal direction in such a manner that the third magnetic field sensor is between the first and the second magnetic field sensors.

7. A method for operating a sensor arrangement, comprising:
generation of sensor signals with a first, a second and a third magnetic field sensor that are arranged along a curved principal direction,
combination of the sensor signals into a first channel signal as well as combination of the sensor signals into a second channel signal, and
as a function of the first and second channel signals, generation and evaluation of an end position signal of a magnetic field source movable relative to the sensor arrangement,
wherein the end position signal is generated and evaluated as a function of a comparison of the first channel signal to an adjustable first threshold value and a comparison of the second channel signal to an adjustable second threshold value, and wherein the end position is generated when the first channel signal is higher than the adjustable first threshold value and the second channel signal is higher than the adjustable second threshold value.

8. The method according to claim 7, comprising:
the combination of the sensor signals into the first channel signal by means of taking the difference of the signals of the first and second magnetic field sensors; and
the combination of the sensor signals into the second channel signal by means of adding the signals of the first and second magnetic field sensors, and by means of subtracting the signal of the third magnetic sensor.

9. The method according to claim 7, wherein the second threshold value is determined by the first threshold signal and multiplication by a factor.

10. The sensor arrangement according to claim 1, wherein the first adjustable threshold value and the second adjustable threshold value are selectable based on a magnetic interference field expected during operation of the sensor arrangement.

11. The method according to claim 7, wherein the adjustable first threshold value and the adjustable second threshold value are selectable based on a magnetic interference field expected during operation of the sensor arrangement.

* * * * *